United States Patent [19]
Scogin

[11] 3,889,653
[45] June 17, 1975

[54] WOOD BURNING HEATER

[76] Inventor: Clifford A. Scogin, 427 Vassar, Sugar Creek, Mo. 64053

[22] Filed: Mar. 4, 1974

[21] Appl. No.: 447,539

[52] U.S. Cl. .......... 126/110 R; 236/45; 126/110 AA
[51] Int. Cl. ................................................. F24h 3/06
[58] Field of Search..126/110 R, 67, 110 A, 110 AA, 126/110 E, 112, 66, 360 R, 91 A; 237/53; 431/173; 236/1 G, 11, 45

[56] References Cited
UNITED STATES PATENTS

| | | | |
|---|---|---|---|
| 1,519,673 | 12/1924 | Doble | 126/110 R |
| 1,724,209 | 8/1929 | Lieber | 126/110 A |
| 2,291,145 | 7/1942 | Buck | 126/110 R |
| 2,521,866 | 9/1950 | Ott | 126/110 R |
| 2,607,335 | 8/1952 | Harding | 126/65 |
| 2,862,666 | 12/1958 | Kriechbaum | 126/110 AA |
| 2,883,948 | 4/1959 | Seidl | 431/173 |
| 3,076,604 | 2/1963 | Robson | 126/110 R |
| 3,171,400 | 3/1965 | Heiman | 126/110 R |
| 3,189,017 | 6/1965 | Hahn | 126/110 R |
| 3,695,250 | 10/1972 | Rohrs et al | 126/110 R |

*Primary Examiner*—John J. Camby
*Assistant Examiner*—Henry C. Yuen
*Attorney, Agent, or Firm*—John A. Hamilton

[57] ABSTRACT

A wood burning heater including a combustion chamber sealed except for top air inlet and outlet openings, a blower operable to introduce air into the inlet to produce a horizontal vortex of air flow in the chamber, whereby wood in the chamber burns from the top down and is largely converted into charcoal before actual combustion. Regulating devices are provided for controlling the rate of air entry and hence the rate of combustion, the regulating devices being either manually or thermostatically operable, but in either event providing a minimal supply of air to prevent extinguishment of the fire.

12 Claims, 8 Drawing Figures

PATENTED JUN 17 1975

3,889,653

SHEET 1

PATENTED JUN 17 1975 3,889,653
SHEET 2
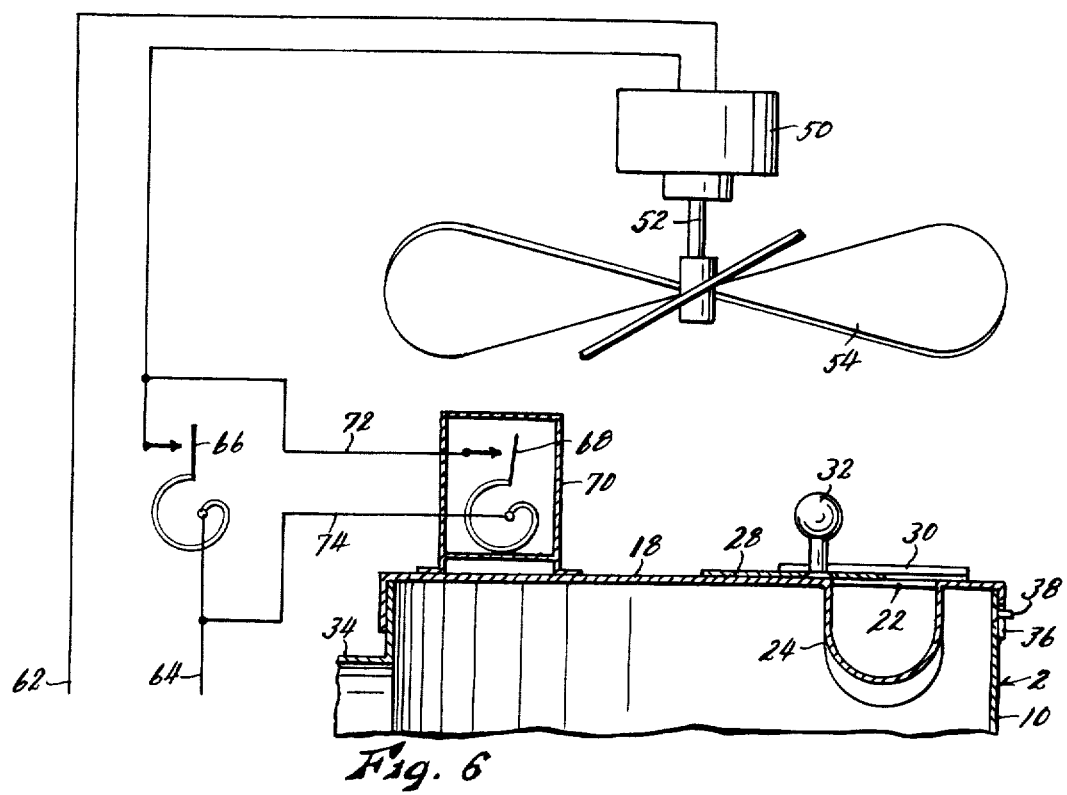
Fig. 6
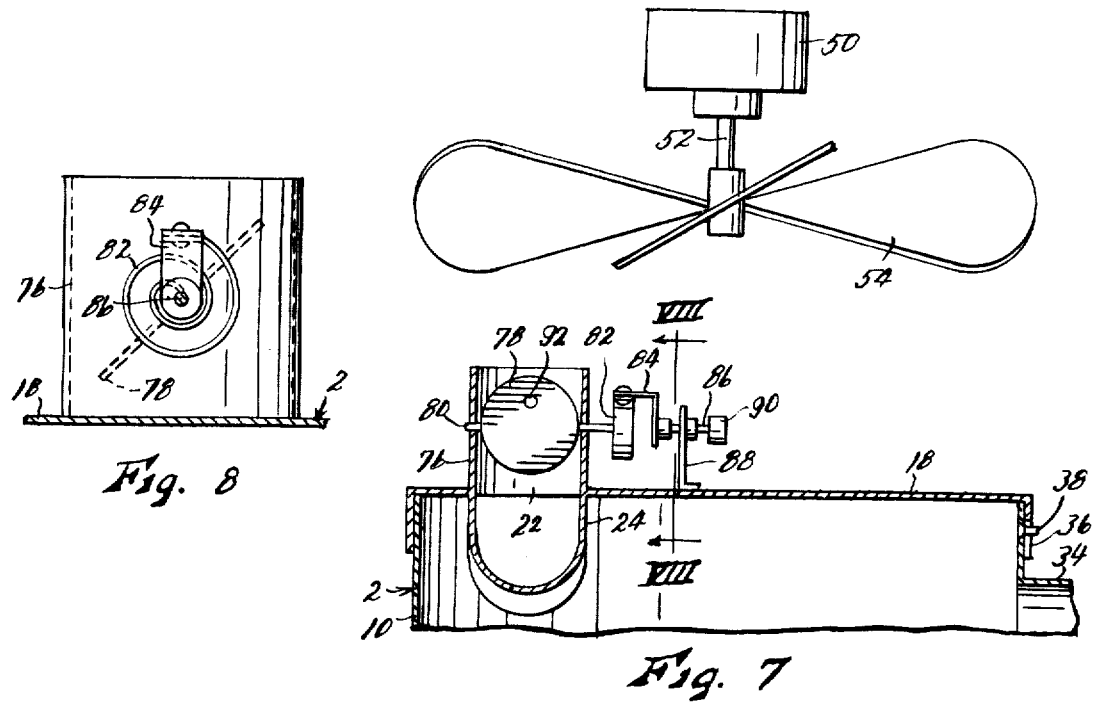
Fig. 8
Fig. 7

3,889,653

WOOD BURNING HEATER

This invention relates to new and useful improvements in heaters or stoves designed to burn wood, although it will be readily apparent that it is also adapted to burn coal or other solid fuel.

The principal object of the present invention is the provision of a heater or stove which will burn wood far more efficiently, and will produce heat at a far more even rate, under satisfactorily close control, than has heretofore been possible.

The burning of wood as a fuel has been rather notoriously inefficient and wasteful, due largely to the fact that once ignited, and provided that sufficient air is supplied thereto, the flames spread rapidly to all parts of the log or other wood piece being burned, so that the wood burns rapidly and heat is released at such an excessive rate that it cannot be effectively utilized, and much of said heat simply passes up the flue or chimney and is wasted. Even with a damper-controlled draft, which can to some extent regulate the rate of combustion, the fact that the wood tends to burn throughout its mass often results in the release of heat at an excessive rate even with a minimum draft. Accordingly, one of the objects of the present invention is the provision of means whereby the inlet air, or more properly the oxygen of the air, is limited in its access to the wood, reaching a further portion of the wood only when the preceding portion has been consumed.

Another object is the provision of a wood burning heater of the character described in which each successive portion of the wood, before it is allowed to burn by supplying oxygen thereto, is converted to charcoal by being heated to carbonization temperature in the presence of insufficient oxygen to support combustion thereof. It is well known that the combustion of charcoal provides a slower, more even release of heat than the direct combustion of raw wood itself.

A further object is the provision of a wood burning heater of the character described including thermostatic controls rendering the control of the amount of heat produced comparable in accuracy to that produced by thermostatic controls used with oil and gas burners. Of course, since it is not desirable to extinguish the fire completely, the thermostatic devices control the air available for combustion, not the fuel supply.

Other objects are simplicity and economy of construction, and efficiency and dependability of operation.

With these objects in view, as well as other objects which will appear in the course of the specification, reference will be had to the accompanying drawing, wherein:

FIG. 6 is a diagrammatic view similar to FIG. 1, showing the heater equipped with one type of thermostatic control, FIG. 7 is a diagrammatic view similar to FIG. 6, but showing the heater equipped with another type of thermostatic control, and FIG. 8 is an enlarged fragmentary sectional view taken on line VIII—VIII of FIG. 7.

Figures 1, 2, 3, 4, 5:
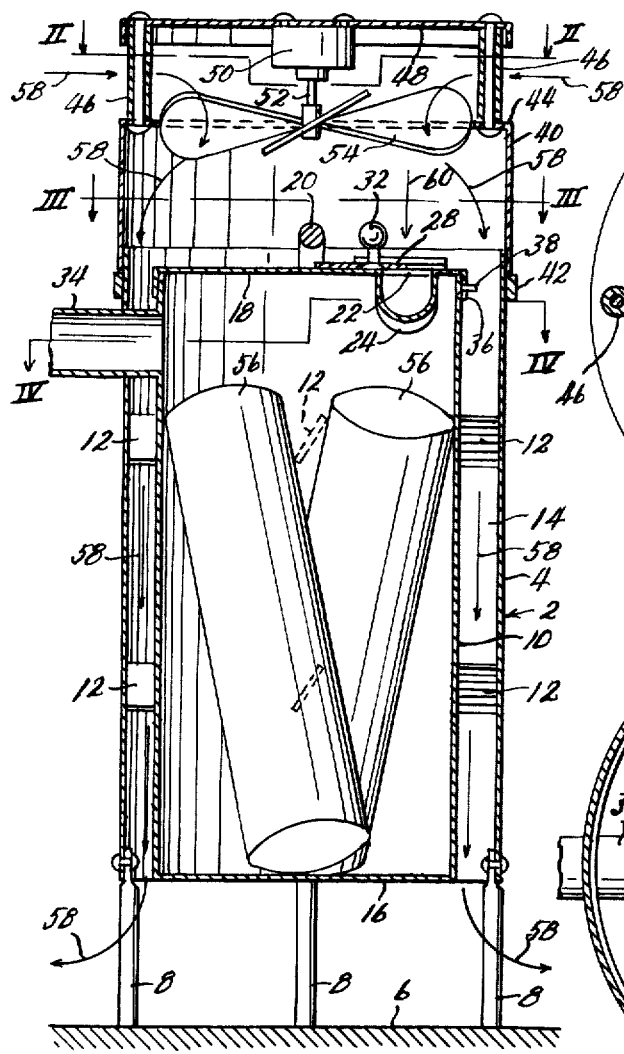
FIG. 1 is a vertical mid-sectional view, with parts left in elevation of a wood-burning room heater embodying the present invention.
FIGS. 2, 3, and 4 are enlarged sectional views taken respectively on lines II—II, III—III and IV—IV of FIG. 1.
FIG. 5 is an enlarged fragmentary sectional view taken on line V—V of FIG. 3.

Like reference numerals apply to similar parts throughout the several views, and the numeral 2 applies generally to a wood-burning room heater, which has been selected to illustrate the wood-burning principles involved in the present invention, and which includes a vertical cylindrical outer housing 4 open at both top and bottom, and supported in spaced part relation above the floor 6 by floor-engaging legs 8, and an inner housing 10 of smaller diameter than the outer housing and supported concentrically therein by vanes 12 extending therebetween and affixed thereto, said vanes being inclined to cause air passing downwardly in the annular space 14 between said housing to move in a helical path. The inner housing constitutes the wood combustion chamber, being sealed at its lower end by a floor 16 and having a removable cover 18 at its upper end. Said cover may be provided with a handle 20, and is provided with a restricted air inlet opening 22 adjacent one side thereof to admit air downwardly into the combustion chamber. Affixed to the inner surface of the cover is an air scoop 24 communicating with opening 22 and operable to direct air entering downwardly through said opening tangentially into the top portion of the combustion chamber, whereby to produce a horizontal whirling or vortex air pattern therein, as indicated by arrows 26 in FIG. 4. In FIGS. 1–6, the effective area of inlet opening 22 is regulated by a sliding damper door 28 movable in guides 30 fixed to the cover, said door being provided with a knob 32 by means of which it may be moved manually to cover variable portions of opening 22. A flue pipe 34 is connected into the upper portion of the combustion chamber, and extends outwardly through outer housing 4 for connection to a chimney or stack. It is preferable that inlet opening 22 be disposed at the side of the combustion chamber opposite flue connection 34, and for this reason the lip of the cover is provided with a notch 36 engageable over a pin 38 fixed in the wall of combustion chamber 10. Thus the cover can be applied only with inlet opening 22 and scoop 24 in proper relation to the flue.

Supported on and extending upwardly from outer housing 4 in concentric relation thereto is an open cylindrical hood member 40. Said hood member rests by gravity at its lower end on a ring 42 fixed to the external surface of housing 4 adjacent its upper edge, and is provided at its top end with an internal peripheral flange 44. Affixed to said flange are a plurality of angularly spaced upright posts 46, to the upper ends of which is affixed a circular top plate 48. An electric motor 50 is affixed centrally to the lower surface of said top plate, and the depending drive shaft 52 of said motor carries a fan wheel 54 operable to produce a downward flow of air through the heater whenever said motor is operating. The principal plane of the fan wheel is disposed in the plane of flange 44, and the fan has only a minimum operating clearance in the opening of said flange, whereby to largely defeat any possible upward backflow of air through said opening.

In operation, hood 40 and combustion chamber cover 18 are removed and wood 56 is inserted into the combustion chamber. As shown, said wood constitutes logs cut to the size normally used in fireplaces, usually 18 or 24 inches long, although it will be apparent that wood in other forms, such as wood chips, over even coal, may be used. Combustion thereof may be initially started in any suitable manner, such for example as by inserting burning paper, cloth, kerosene, or the like. A gas burner for providing a starter flame could also be used. When combustion has been well started, cover 18 and hood 40 are replaced, and damper door 28 is adjusted to a partially open position. Fan motor 50 is then started and operates continuously. Most of the air delivered downwardly by fan 54 passes downwardly through space 14 between the outer and inner housings of the heater, as indicated by arrows 58 in FIG. 1, where it is heated by contact with the combustion chamber, and a rotatory horizontal spinning motion is imparted thereto by vanes 12, and finally emerges from the lower end of space 14 to circulate in the room being heated. The structure shown produces a highly advantageous air flow pattern in the room, and is the subject matter of my copending application Ser. No. 437,315, filed May 8, 1974. However, a portion of the air delivered by the fan enters downwardly through inlet opening 22 of the combustion chamber, as indicated by arrow 60 in FIG. 1, and it is the action occurring within the combustion chamber with which the present application is concerned.

Air entering inlet opening 22 is caused by air scoop 24 to assume a horizontal whirling vortex pattern in the top portion of the combustion chamber, as indicated by arrows 26 in FIG. 4, by reason of the horizontal tangential attitude of the scoop relative to the chamber. Due to the forced draft provided by fan 54, air enters at a somewhat higher rate than it can be carried away by flue 34, and is therefore forced downwardly in the chamber, and is capable of providing oxygen for combustion in all parts of said chamber, even in the bottom parts thereof. However, as it moves downwardly in the chamber, the oxygen content thereof is consumed, and it becomes incapable of supporting combustion. Therefore, actual combustion of the wood is initially confined to the top portion of the chamber, any air circulating below this upper combustion zone being so deficient in oxygen as to be incapable of supporting combustion in lower zones. As the wood in the upper zone is consumed, the fresh, oxygen-bearing air is allowed to circulate lower in the chamber. Therefore, the wood tends to burn gradually from the top down, releasing its heat content at a slower, more positively controlled rate than is usually the case in burning wood for heat, since in all previous wood burning heaters within my knowledge the wood is supported by a grate with an air inlet thereunder, so that the flame normally spreads to all portions of the wood without control, with the result that the heat is produced at an excessive rate and much of it wasted by passage thereof up the flue. In the present device, the general rate of combustion can be controlled rather closely by manual adjustment of damper door 28, although of course some minimal air supply must be maintained at all times to prevent complete extinguishment of the fire and the necessity of a complete re-starting cycle. If wood chips, coal or other solid fuel of a much smaller lump size than the logs shown is used, it may be noted that air scoop 24 may in many cases be dispensed with. Such fuels occupy the combustion chamber more solidly than the logs and hence tend to prevent or largely inhibit circulation of fresh air below the fuel surface, so than combustion is largely confined to the surface of the fuel bed even without the horizontal vortex air pattern provided by the air scoop.

The gradual burning of the fuel from top to bottom of the combustion chamber has another useful effect. Air, though all or most of the oxygen thereof has been consumed, does circulate below the zone of actual combustion, and is of course very hot. Also, wood below the level of actual combustion, while it cannot burn due to the presence of insufficient oxygen, is nevertheless heated sufficiently to cause carbonization thereof. That is, it is converted into charcoal. A temperature of about 800°F. is required to initiate this carbonization reaction. Thus, when sufficient oxygen to support combustion does eventually reach any given level, that level is occupied by charcoal, not raw wood, and it is the charcoal which actually burns. It is well known that the combustion of charcoal produces heat at a slower, more even rate than the combustion of raw wood. In case coal is the fuel being used, the principle is the same, the destructive distillation of coal removing substantially all elements except carbon therefrom and producing coke.

The heater shown is also well adapted for use with thermostatic controls, as illustrated in FIGS. 6–8, although since a wood or coal flame cannot be turned on and off with the same facility as oil or gas burners, the thermostatic controls must of course be related to draft control rather than fuel supply. FIG. 6 diagrams a control thermostat system in which the motor 50 of fan 54 is provided with an operative electric circuit by wires 62 and 64 from a source of electric power, a thermostatic switch 66 being connected in series in the motor circuit and operable to close to actuate the motor whenever heat is called for, and to open whenever the air temperature surrounding the thermostat rises to the setting thereof. Said thermostat may be disposed in the room or other space affected by the heater. With the fan operating, the wood or charcoal burns at the rate permitted by the degree to which damper door 28 has been opened. When the fan is not operating, the air supply to the combustion chamber is largely cut off, since any small amount of air drawn into inlet opening 22 by the flue draft is confined largely to the top portion of the chamber and is drawn off through the flue, circulating only very slightly if at all to the lower regions of the chamber, so that while the fire might burn for a short additional time, and is still producing heat, it would soon be completely extinguished. To prevent this occurrence, there is provided a second thermostatic switch 68 mounted in a ventilated housing 70 which in turn is mounted on combustion chamber cover 18 so as to be cooled by air flowing from fan 54. Switch 68 is connected in series in a circuit provided by wires 72 and 74 and bypassing thermostat 66. Its operation is opposite to that of the thermostat, closing when its temperature rises to a higher level, and opening when its temperature falls to a lower level. it normally remains open so long as fan 54 remains in operation, being cooled by said fan. However, when the fan is turned off by the thermostat, switch 68 is warmed by residual heat from the combustion chamber, and closes to reactivate the fan, but only until it is again cooled by the fan. Thus as long as themostat 66 is open, fan 54 operates intermittently. During its periods of operation, it supplies air to the combustion chamber in sufficient quantity to prevent complete extinguishment of the flame by reviving it from time to time. The periodic operation of the fan also draws currents of cool air over motor 50, to prevent overheating thereof and possible damage thereto by residual heat rising from the combustion chamber. Of course, the heater is producing heat during the periodic operations of the fan, but usually proper adjustment of switch 68 will produce a condition wherein the overall or average rate of heat output of the heater, during periods of intermittent operation of the fan, will be far less than the minimum production of heat required to maintain the space being heated of the setting of thermostat 66, so that eventually said thermostat will close to produce continuous fan operation. With the heater shown, positioned in a room of average size, operation of fan 54 about one minute of each five, by switch 68, during periods when thermostat 66 is open, has been found adequate for the purposes stated, but obviously this is a matter to be determined by experimentation and choice in each set of circumstances. Adjustment may be made by setting switch 68 to open and close at temperatures either more closely or more widely spaced apart.

FIGS. 7–8 show a different and somewhat simplified type of thermostatic control, in which an open-ended pipe 76 is affixed to combustion chamber cover 18 and extends upwardly therefrom, communicating with air inlet opening 22 at its lower end. A circular damper door 78 is mounted in said pipe for pivotal movement on a shaft 80 disposed diametrically to both the pipe and the door, the shaft being fixed to the door and journalled in the pipe, and extending externally of the pipe, where it is affixed to one end of a spiral bimetallic thermostat 82 concentric thereto, the opposite or outer end of the thermostat being affixed to an arm 84 extending radially from a shaft 86 concentric with shaft 80 and journalled frictionally in a bracket 88 fixed to cover 18, shaft 86 being rotatable in said bracket by means of a manual knob 90 whereby to adjust the temperatures at which the termostat will open and close door 78. When the termostat calls for heat, door 78 opens to supply more air to the combustion chamber. Fan 54 operates continuously with this type of control. When the termostat signals that the heat requirement has been satisfied, door 78 moves toward a closed position, but the door is provided with a small aperture 92 so that enough air is furnished to the combustion chamber, even when said door is completely closed, to keep the fire burning at a minimal rate. Ideally, of course, door 78 will eventually adjust itself to a partially open position wherein it supplies air at the rate required to produce combustion at a rate just sufficient to maintain the temperature of the heated space at the desired level. While thermostat 82 is mounted on the combustion chamber cover, room air delivered by fan 54 circulates freely thereabout to maintain it substantially at room temperature, or at least at a temperature predictably related to, though perhaps somewhat higher than room temperature, so than the room temperature may be controlled thereby.

While I have shown and described certain specific embodiments of my invention, it will be readily apparent that many minor changes of structure and operation could be made without departing from the spirit of the invention. For example, it is necessary only that the air inlet and outlet of the combustion chamber be disposed in the top portion thereof, and that the air inlet could be in the top side portion thereof rather than in the cover, and could be tangentially arranged to produce the horizontal vortex pattern of air flow. Also, while the adjustability of the air volume delivered, to produce variable rates of combustion, is shown as accomplished by variable dampers, it could obviously also be produced by variable-speed fans. The fan as shown delivers only a small portion of its output to the combustion chamber, the major portion of its output being used to circulate air outside of the combustion chamber, and in the space being heated. Air for the two purposes could be supplied from different sources to render the control thereof independent. For example, if the heater were to be used as a central furnace, with the hot air output being ducted to perhaps many rooms of a building, and hence requiring a large and powerful fan for circulation, it might be desirable to furnish combustion air by means of a smaller auxiliary fan.

What I claim as new and desire to protect by Letters Patent is:

1. A heater adapted to burn wood, coal or other solid fuel, and comprising:
   a. a hollow vertically elongated combustion chamber adapted to contain said solid fuel to be burned, and having combustion air inlet and outlet openings both disposed at or closely adjacent the top thereof, but being otherwise sealed, and
   b. a blower fan operable to introduce a current of air into said combustion chamber through said inlet opening to supply oxygen for the combustion of said fuel, said fuel being initially ignited by other means.

2. A heater as recited in claim 1 wherein said air inlet opening is configurated to direct said entering air in a horizontally whirling vortex pattern within said combustion chamber.

3. A heater as recited in claim 1 with the addition of regulating means operable to vary the quantity of air entering said combustion chamber through said inlet opening.

4. A heater as recited in claim 3 wherein said regulating means constitutes a damper door operable to adjust the effective area of said inlet opening.

5. A heater as recited in claim 4 with the addition of an outer heater housing surrounding said combustion chamber with an air space therebetween open to the surrounding atmosphere, and wherein said blower fan is operable to draw air from the surrounding atmosphere and to circulate it through said air space and return it to said atmosphere, a proportion of the air determined by the effective area of said inlet opening being delivered to said combustion chamber through said inlet opening.

6. A heater as recited in claim 3 wherein said regulating means is manually operable.

7. A heater as recited in claim 4 wherein said damper door is manually operable.

8. A heater as recited in claim 1 with the addition of regulating means operable to control said blower fan, and comprising:
   a. a thermostatic device operable respectively to actuate and deactuate said blower fan as the temperature of the space being heated respectively falls below or rises above the setting thereof.

9. A heater as recited in claim 8 wherein said regulating means additionally includes a second thermostatic device mounted directly adjacent said combustion chamber so as to be warmed by heat radiating therefrom, and disposed also adjacent said fan and directly in the path of air delivered by said fan, whereby to be cooled thereby, said second thermostatic device being operable, whenever said blower fan is deactuated by said first-named thermostatic device, to overrule said first-named thermostatic device to actuate and deactuate said fan when the temperature thereof respectively rises above or falls below the setting thereof, whereby said fan is alternately actuated by residual heat radiating from said combustion chamber, and deactuated by cooling air delivered by said fan, and hence operates intermittently to maintain minimal combustion in said chamber at all times said fan would normally be deactuated by said first-named thermostatic device.

10. A heater as recited in claim 9 with the addition of a manually movable damper door operable to vary the effective area of said inlet opening.

11. A heater as recited in claim 1 with the addition of regulating means operable to vary the quantity of air entering said combustion chamber through said inlet opening, and comprising:
   a. an adjustable damper door regulating the effective area of said inlet opening, and
   b. a thermostat device disposed externally of said combustion chamber in the path of air delivered by said fan, and operable to open said damper door wider responsively to a falling air temperature, and to move said door toward a closed position responsively to a rising air temperature.

12. A heater as recited in claim 11 wherein said damper door has a small aperture formed therethrough, whereby to admit sufficient air to said combustion chamber to maintain minimal combustion therein even when said door is completely closed by said thermostat device.

* * * * *